United States Patent Office 2,897,241
Patented July 28, 1959

2,897,241

1-ETHYNYLCYCLOHEXYL PROPARGYL ETHER

Edward John Watson, Midland, Mich., assignor to The Dow Chemical Company, Midland, Mich., a corporation of Delaware No Drawing. Application June 30, 1958
Serial No. 745,330

2 Claims. (Cl. 260—611)

The present invention is directed to 1-ethynylcyclohexyl propargyl ether corresponding to the formula

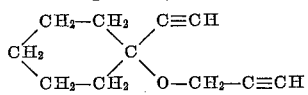

This novel compound is an oily liquid somewhat soluble in many organic solvents and of very low solubility in water. The compound is useful as a herbicide for the control of the growth of the germinant seeds and emerging seedlings of many undesirable broad and narrow leaf weed species such as wild mustard and canary grass. The compound is also useful as a fungicide for the control of many fungal organisms such as *Alternaria solani*.

The new compound may be prepared by reacting an alkali metal salt of 1-ethynylcyclohexanol such as the sodium or potassium salts with a propargyl halide such as propargyl chloride or bromide. The reaction is carried out in an inert reaction medium such as diethyl ether, benzene or toluene. Good results are obtained when employing substantially equimolecular proportions of the reactants. The reaction is somewhat exothermic and takes place smoothly at temperatures of from −10° to 50° C. with the production of the desired product and alkali metal halide of reaction. The temperature may be controlled by regulating the rate of contacting the reactants and by external cooling.

In carrying out the reaction, the reactants are contacted with each other in the reaction medium. The contacting is carried out portion-wise with stirring and at a temperature of from −10° to 50° C. Upon completion of the reaction, the reaction mixture may be washed with water and thereafter fractionally distilled under reduced pressure to separate the desired product as a liquid material. Since any unreacted 1-ethynylcyclohexanol in the reaction mixture has a tendency to decompose somewhat forcefully under alkaline conditions at elevated temperatures, the distillation should be carried out under acid conditions in the reaction mixture.

In a representative operation, 125 grams (5 moles) of metallic sodium was reacted with an excess of liquid ammonia (4 liters) in the presence of a few crystals of ferric nitrate as catalyst to prepare a dispersion of sodium amide. 1-ethynylcyclohexanol (620 grams; 5 moles) was slowly added portion-wise to the above dispersion to produce the sodium salt of 1-ethynylcyclohexanol. The addition was carried out portion-wise with stirring and at room temperature. Upon completion of the addition, the reaction mixture was diluted with two liters of diethyl ether and the ammonia removed from the mixture by evaporation.

Propargyl bromide (595 grams; 5 moles) was added slowly portion-wise with stirring to the above prepared mixture containing the sodium salt of 1-ethynylcyclohexanol. The addition was carried out over a period of about 3 hours and at a temperature of from 25° to 34° C. Upon completion of the addition, the reaction mixture was washed with water, and the washed mixture dried with magnesium sulfate. The dried mixture was then fractionally distilled under reduced pressure and in the presence of a few grams of succinic acid to maintain acid conditions in the reaction mixture. As a result of these operations, there was obtained a 1-ethynylcyclohexyl propargyl ether product boiling at 50°–51° C. at 1.2–1.3 millimeters pressure and having a refractive index $n/D$ of 1.4776 at 25° C.

The new ether compound has been tested and found useful as a herbicide and fungicide. For such use, the product may be dispersed on a finely divided solid and employed as a dust. Also such mixtures may be dispersed in water with the aid of a surface active agent and the resulting aqueous suspensions employed as sprays. In other procedures, the product may be employed as a constituent in oil in water or water in oil emulsions, or in water suspensions with or without the aid of a surface active dispersing agent. In representative operations, 100 percent controls of the growth of the seeds and emerging seedlings of radish, millet and mild oats have been obtained with 1-ethynylcyclohexyl propargyl ether when applied at the rate of 50 pounds per acre to soil previously planted with the named plant species.

I claim:
1. 1-ethynylcyclohexyl propargyl ether.
2. A method for the manufacture of 1-ethynylcyclohexyl propargyl ether which comprises reacting an alkali metal salt of 1-ethynylcyclohexanol with a propargyl halide.

No references cited.